(12) United States Patent
Bradley (10) Patent No.: US 11,210,626 B2
(45) Date of Patent: Dec. 28, 2021

(54) INVENTORY MANAGEMENT

(71) Applicant: THE BOEING COMPANY, Chicago, IL (US)

(72) Inventor: Randolph L. Bradley, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 122 days.

(21) Appl. No.: 16/189,733

(22) Filed: Nov. 13, 2018

(65) Prior Publication Data

US 2020/0151654 A1 May 14, 2020

(51) Int. Cl.
*G06Q 30/00* (2012.01)
*G06Q 10/08* (2012.01)
*G06Q 30/02* (2012.01)
*G06Q 10/06* (2012.01)

(52) U.S. Cl.
CPC ..... *G06Q 10/087* (2013.01); *G06Q 10/06315* (2013.01); *G06Q 30/0202* (2013.01)

(58) Field of Classification Search
CPC ..... G06F 15/16; G06F 15/173; G06Q 10/087; G06Q 10/06315
USPC ...................................... 705/16, 28
See application file for complete search history.

(56) References Cited

U.S. PATENT DOCUMENTS

| | | | | |
|---|---|---|---|---|
| 2002/0161674 A1* | 10/2002 | Scheer | ............... | G06Q 10/0631 705/28 |
| 2004/0186916 A1* | 9/2004 | Bjorner | ............... | G06F 16/1844 709/248 |

OTHER PUBLICATIONS

"The Bisection Method," <http://www.mathcs.emory.edu/%7Echeung/Courses/170/Syllabus/07/bisection.html> retrieved Nov. 12, 2018, 11 pgs.
"Planning Software for the World's Best Companies," Demand Works, <https://demandworks.com/> retrieved Nov. 12, 2018, 3 pgs.
"MRO Inventory Optimization," <https://oniqua.com/mroinventory-optimization/> retrieved Nov. 12, 2018, 4 pgs.
"Multi-Echelon Inventory Optimization (MEIO)," ToolsGroup, <https://www.toolsgroup.com/solutions/multi-echelon-inventory-optimization/> retrieved Nov. 12, 2018, 4 pgs.
"Bisection Method," Wikipedia, <https://en.wikipedia.org/wiki/Bisection_method> retrieved Nov. 12, 2018, 5 pgs.
"Inventory Optimization," Oracle Value Chain Planning, Oracle Data Sheet, <www.oracle.com/us/solutions/046988.pdf> retrieved Nov. 12, 2018, 5 pgs.
"Supply Chain Planning Solutions," Vanguard Software, <http://www.vanguardsw.com/solutions/supply-chain-planning/inventory-optimization-software/> retrieved Nov. 12, 2018, 5 pgs.
"Inventory Optimization Software," Llamasoft Supply by Demand, <https://www.llamasoft.com/solutions/inventory-optimization/> retrieved Nov. 12, 2018, 6 pgs.

(Continued)

*Primary Examiner* — Rokib Masud
(74) *Attorney, Agent, or Firm* — Moore Ip Law (57) ABSTRACT

An apparatus includes a controller that is operable to determine a safety stock factor that enables a reorder point for an item to be calculated. The controller is also operable to determine an expected amount of backorders for the item using a backorder function based on the reorder point, a reorder quantity, a demand rate, and a lead time.

20 Claims, 7 Drawing Sheets

(56) References Cited

OTHER PUBLICATIONS

Silver, Edward A., et al., "Inventory Management and Production Planning and Scheduling" Approximations and Excel Function, 3rd Edition, 1998, p. 735-738.
Bradley, Randolph "Supplement to a Supply Chain Business Proess for Setting and Evaluating Stock Levels," Jun. 22, 2018, pp. 1-12.
Excel Solver, Optimization Software, Monte Carlo Simulation, https://www.solver.com/, retrieved Sep. 23, 2020, pp. 1-9.
SAS Products and Solutions, https://www.sas.com/en_us/software/all-products.html, retrieved Sep. 23, 2020, pp. 1-5.
Sherbrooke, Craig C., "METRIC: A Multi-Echelon Technique for Recoverable Item Control," The Rand Corporation, Memorandum RM-5078-PR, Nov. 1966, pp. 1-65.
Solutions Blue Yonder, https://jda.com/solutions/manufacturing-distribution.../inventory-optimization, retrieved Sep. 23, 2020, pp. 1-5.

* cited by examiner

INVENTORY MANAGEMENT

FIELD OF THE DISCLOSURE

The present disclosure is related to inventory management.

BACKGROUND

The amount of inventory that a business has on-hand and the frequency of orders to replenishment an inventory of the business affect costs related to business operations. As a non-limiting example, if the business has forty of items in stock and rarely receives a customer order for the item, the items can be sitting in storage for a relatively long period of time. The costs of storing the items (e.g., holding costs) can become increasingly expensive the longer that the items sit in storage. As non-limiting examples, the holding costs may increase over time as the business has to pay insurance premiums for storing the items, the holding costs may increase over time as the business has to pay rent to store the items, etc. Thus, the lower the inventory on the shelf, the lower the holding costs.

Further, the more frequently replenishment orders are placed, the more expensive cumulative order costs. As non-limiting examples, while routine orders for inexpensive parts may be automated, shipping costs, accounting costs, order management costs, receiving costs, stocking costs, etc., must all be factored into overall order cost. For more expensive parts, the time required for an asset manager to review an order, for a supplier manager to place an order, for a supplier manager to coordinate material and production specifications, and for a supplier manager to make on-site visits to the production facility to oversee manufacturing may all factor into order cost. Thus, the fewer the number of orders, the lower the overall order cost.

Ordering in economic order quantity, also known as the Wilson Economic Order Quantity (EOQ), improves holding costs and order costs for each item, so as to achieve a reduced total relevant cost per unit time, that is, the sum of those costs which can be influenced by the reorder quantity.

Additionally, the amount of inventory of an item (e.g., a stock keeping unit (SKU)) that a business has on-hand can affect a customer satisfaction rating. As a non-limiting example, if a customer orders fifteen units of an item from a business and the business only has ten units of the item in stock, the business cannot fill the customer's order without reordering additional units of the item from a third-party (e.g., a warehouse). The time associated with reordering the additional units may be dependent on multiple factors, such as the warehouse stocking policy, the manufacturing lead time, repair time for parts which can be repaired, transportation time from the warehouse to the business, the delivery method, etc. Thus, the customer may have to wait an extended period of time before the customer's order is filled if the inventory level is too low. As a result, the customer satisfaction may be relatively low.

A number of inventory models exist which attempt to select the lowest cost mix of items subject to achieving a fill rate constraint (e.g., a desired goal). In the special case of service parts, which are items used to maintain and repair an end item such as piece of stationary equipment (e.g., an air compressor, a generator, a metal working machine, a saw mill, etc.) or a vehicle (e.g., an airplane, an automobile, mining equipment, a ship, a truck, etc.), these models may be tailored to an equipment availability constraint or to an average days delay constraint. These service parts may be consumable (e.g., pan-stock such as nuts and bolts, or non-repairable items such as a windscreen, a panel, potted electronics cards, etc.) or repairable (e.g., electronic items, hydraulic items, engines, auxiliary power units, etc.).

SUMMARY

According to one implementation of the present disclosure, a method of processing inventory includes identifying, at a controller, a first inventory fill rate associated with an item. As a non-limiting example, the method can include calculating a fill rate through a Multi-Echelon Technique for Recoverable Item Control (METRIC) style inventory model for an item with a reorder quantity of one (1). The method can also include calculating an Economic Order Quantity (EOQ). As a non-limiting example, the method can include calculating an EOQ using a Wilson EOQ model. This method further includes performing an exponential search to determine an upper boundary value of a safety stock factor that results in a second inventory fill rate that is greater than the first inventory fill rate and a lower boundary value of the safety stock factor that results in a third inventory fill rate that is less than the first inventory fill rate. The method also includes performing a recursive bisection search based on the upper boundary value and the lower boundary value to determine a value of the safety stock factor that results in an output inventory fill rate that converges with the first inventory fill rate. The method further includes determining, based on the value of the safety stock factor, a reorder point associated with the item. The method also includes displaying the reorder quantity and the corresponding reorder point at a display device. As a non-limiting example, the method can include calculating a reorder quantity for an item ordered in EOQ with a fill rate identical to a first inventory fill rate for an item with a reorder quantity of one (1).

According to another implementation of the present disclosure, an apparatus includes a first interface configured to receive data indicating a reorder point for an item, a reorder quantity for the item of one (1), a price for reordering the item, a demand rate for the item, and a lead time for reordering the item. The data received can also indicate order cycle time. As a non-limiting example, order cycle time in days, or the number of days of demand the EOQ will supply, may be calculated as 365 days/year*EOQ/annual demand. The apparatus also includes a controller coupled to the first interface. The controller is configured to determine a time-averaged expected amount of backorders for the item using a backorder function based on the reorder point, the reorder quantity, the demand rate, and the lead time. The backorder function enables the controller to determine the time-averaged expected amount of backorders independent of a relationship between a cycle time and the lead time. The apparatus also includes a second interface coupled to the controller. The second interface is configured to communicate for display an indication of the time-averaged expected amount of backorders.

According to another implementation of the present disclosure, an apparatus includes an interface configured to receive an indication of an inventory level for an item, an indication of a demand rate for the item, an indication of a lead time for reordering the item, and an indication of a cycle time for an inventory of the item. The apparatus also includes a controller coupled to the interface. The controller is configured to estimate an amount of time for the inventory level to deplete based on the inventory level and the demand rate. The controller is also configured to determine a period of time over which to simulate steady-state inventory, based on the amount of time for the inventory to deplete, the demand rate, the lead time, and the cycle time.

One advantage of the above-described implementations is to enable an inventory model developed for high-cost, low-demand repairable items to also work with low-cost, high demand consumable items. The second model calculates reorder points for items ordered in EOQ which are in concert with the fill rate of the first model, in which reorder quantity is each (e.g., one (1)). Thus, existing inventory models may be extended to encompass both repairable and consumable items, or to work equally well with only consumable items, without changing the results of the model. As this implementation works at the part level for one inventory, it will be recognized by a practitioner in the field that this solution remains viable at the part and location level, and thus extends to multi-echelon (e.g., multiple warehouse and multiple operating location) models, as well as multi-indenture models (e.g., items which are used within an assembly to repair other items).

Another advantage of the above-described implementations is to reduce total relevant costs, such as holding costs, shipping costs, accounting costs, order management costs, receiving costs, stocking costs, etc. Additionally, the features, functions, and advantages that have been described can be achieved independently in various implementations or may be combined in yet other implementations, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple positive test values are illustrated and associated with reference numbers 220A, 220B, etc. When referring to a particular one of these positive test values, such as the first positive test value 220A, the distinguishing letter "A" is used. However, when referring to any arbitrary one of these positive test values or to these positive test values as a group, the reference number 220 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
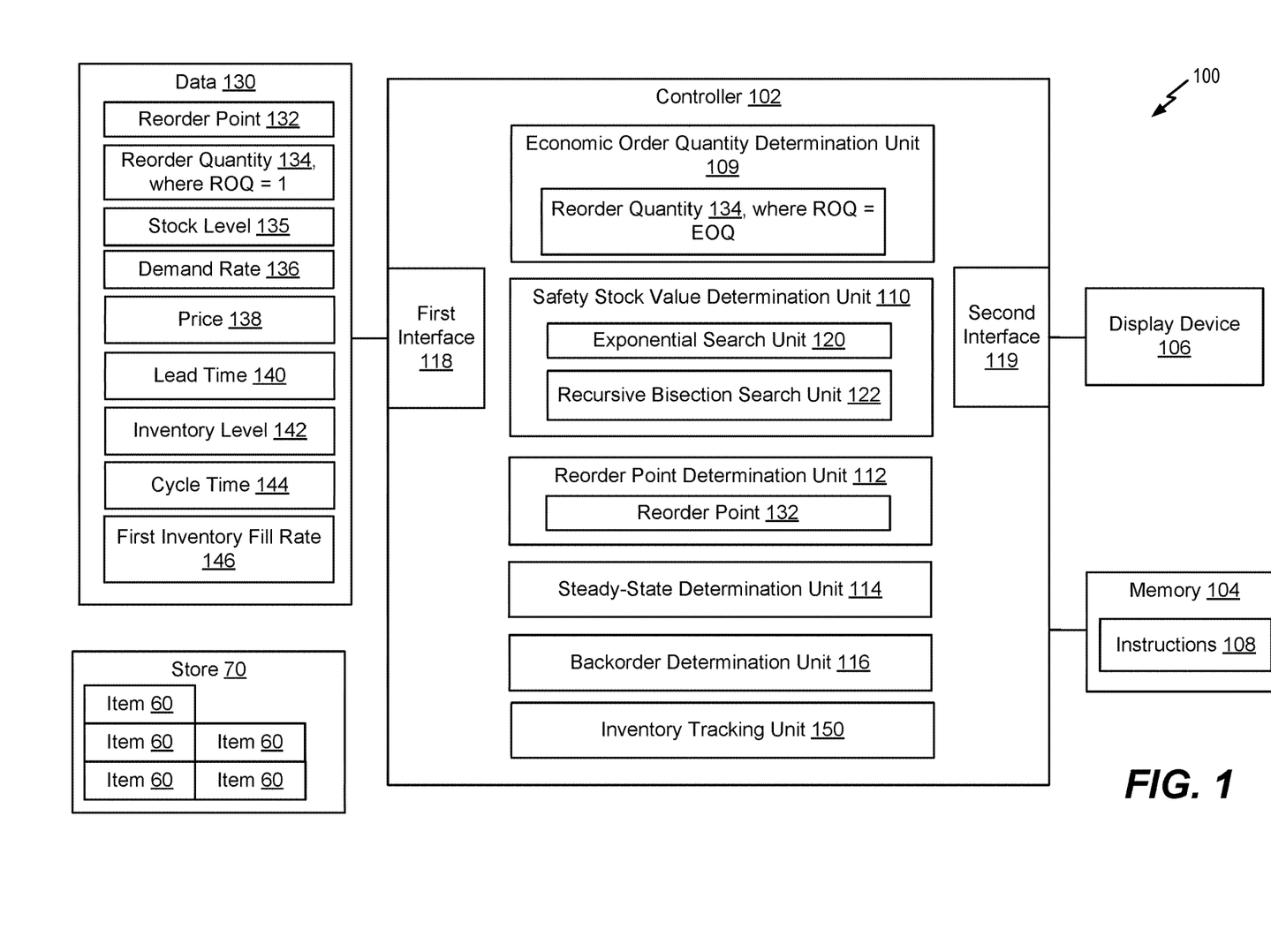
FIG. 1 is a diagram of an example of a system that is operable to perform operations associated with inventory management.

FIG. 1 is a diagram of a system 100 that is operable to perform operations associated with inventory management. To illustrate, a store 70 can include an inventory of an item 60, and the system 100 is operable to perform different operations to manage the inventory of the item 60. For example, the system 100 can determine parameters that are used to determine a reorder point for the item 60, a reorder quantity of the item 60, etc. The system 100 is also operable to determine the time-averaged expected amount of back-orders for inventory items or an amount of time over which to simulate steady-state inventory for the item 60. The operations of the system 100 are described in greater detail with respect to FIGS. 1-4. According to one implementation, the item 60 includes a consumable part. A consumable part is an item that is used to completion, an item that is discarded, or a single-use item. For example, in an office scenario, a consumable part can include paper, pens, toner, ink cartridges, etc. According to another implementation, the item 60 includes a repairable part. A repairable part is an item that is deemed worthy of repair based on economic considerations of a repair cost versus a cost to replace. For example, a repairable part can include landing gear of an aircraft, an office printer, etc. It should be noted that while a single item 60 is shown in FIG. 1, the techniques described herein work with any combination of consumable and repairable parts.

The system 100 includes a controller 102, a memory 104 coupled to the controller 102, and a display device 106 coupled to the controller 102. A first interface 118 is coupled to receive data 130 (e.g., desired stock levels from a first inventory model, where reorder quantity (ROQ) equals one) associated with the inventory of the item 60, and a second interface 119 (e.g., a graphical user interface which displays stock levels from a second inventory model, where ROQ=economic order quantity (EOQ)) is coupled to display device 106. The controller 102 includes an EOQ determination unit 109, a safety stock value determination unit 110, a reorder point (ROP) determination unit 112, a steady-state determination unit 114, a backorder determination unit 116, and an inventory tracking unit 150. The memory 104 is a non-transitory computer-readable medium that includes instructions 108 that are executable by the controller 102 to perform the operations described herein.

The data 130 can indicate different parameters associated with the inventory of the item 60. For example, the data 130 can indicate a reorder point 132 for the item 60. The reorder point 132 is the level of inventory that triggers an action to replenish the item 60. The data 130 can also indicate a reorder quantity 134 of the item 60, which is typically, but not limited to, one (e.g., each). The reorder quantity 134 is the magnitude or the number of units to be ordered in a new purchase order for the fresh supply of the item 60. The stock level 135 is the sum of the reorder point 132 and the reorder quantity 134. The stock level 135 corresponds to how many items 60 would be needed for the store 70 to be considered "fully stocked." Thus, the inventory level 142 reaches the reorder point 132, the stock level 135 corresponds to the sum of the inventory level 142 (at the reorder point 132) and the reorder quantity 134. Although the reorder point 132, the reorder quantity 134, and the stock level 135 are included in the data 130 that is provided to the controller 102 via a user, as described below, in some implementations, the reorder point 132 and the reorder quantity 134 can be automatically determined at the controller 102 based on other parameters such as fill rate, spares availability, or average days delay. In other implementations, the reorder point 132, the reorder quantity 134, and the stock level 135 can be provided by an inventory system that automatically tracks each time a purchase of the item 60 is completed.

The data 130 can also indicate a demand rate 136 for the item 60. The demand rate 136 is the number of units of the item 60 requested by customers in a period of time. The data 130 can also indicate a lead time 140 for the item 60. The lead time 140 is the time between the placement of an order (e.g., a reorder) for the item 60 and delivery of the item 60 to the store 70 from the next highest echelon of supply. The data 130 can also indicate an inventory level 142 of the item 60. The inventory level 142 is the number of items 60 that are in stock to process or resell (e.g., the number of items 60 that are in the store 70). The inventory level 142 equals items on-hand (or on the shelf) plus items due-in from supply minus backorders (or committed inventory). For example, in FIG. 1, the inventory level 142 of the item 60 is five. The data 130 can also indicate a cycle time 144 of the item 60. The cycle time 144 (or process time) indicates the number of periods of demand the ROQ 134 will supply. The data 130 can also indicate a first inventory fill rate 146 for the item 60. A fill rate (e.g., the fraction of customer demand that is met through stock on-hand) or perfect order fulfillment (e.g., the fraction of orders, to include order quantities in multiples, that are met in full through stock on-hand) may be selected as the target fill rate.

The economic order quantity determination unit 109 determines the number of units (e.g., the reorder quantity 134) to be ordered at the reorder point 132 by using the Wilson economic order quantity formula to reduce total relevant costs, by reducing the sum of order cost and holding cost.

The safety stock value determination unit 110 is configured to determine a value of a safety stock factor (k) that results in an output inventory fill rate that converges with the first inventory fill rate 146 (e.g., the "target" inventory fill rate). The safety stock factor (k) is a parameter that is used to determine a level of extra stock (e.g., a safety stock) of the item 60 that is maintained at the store 70 to mitigate risk of stock-outs caused by uncertainties in demand and lead time. Safety stock (ss) can be expressed as $ss=k*\sigma_L$, where k=safety stock factor (k), and $\sigma_L$=the standard deviation of demand which occurs during lead time 140. Reorder point (s) can be expressed as $s=X_L+ss$, where $X_L$=the expected demand which occurs during lead time, and ss=safety stock. The expected demand which occurs during lead time $X_L$ can be expressed as $X_L$=demand rate 136*lead time 140, where demand rate and lead time are measured in the same units of time, such as hours, days, months or years.

The safety stock value determination unit 110 includes an exponential search unit 120 and a recursive bisection search unit 122. The exponential search unit 120 is configured to perform an exponential search to determine an upper boundary value of the safety stock factor (k) that results in a second inventory fill rate that is greater than the first inventory fill rate 146 and a lower boundary value of the safety stock factor (k) that results in a third inventory fill rate that is less than the first inventory fill rate 146. The operations of the exponential search unit 120 are described in greater detail with respect to FIG. 2. The recursive bisection search unit 122 is configured to perform a recursive bisection search based on the upper boundary value and the lower boundary value to determine a value of the safety stock factor (k) that results in the output inventory fill rate converging with the first inventory fill rate 146. The operations of the recursive bisection search unit 122 are described in greater detail with respect to FIG. 3.

The safety stock value determination unit 110 enables safety stock factor (k) determinations to be performed more rapidly, when compared to conventional techniques. As a non-limiting example, the safety stock value determination unit 110 determines the safety stock factor (k) in less than four seconds, as compared to conventional techniques that often take over forty-five minutes to determine the safety stock factor (k). Conventional techniques for determining the safety stock factor (k) often involve much more complex calculations that can cause standard processing platforms (e.g., spreadsheets) to "crash" or otherwise be ineffective due to the large number of interrelated variables that must be computed recursively.

Further, issues arise with algorithms for determining Economic Order Quantity (EOQ), and the safety stock factor "k" used in setting Reorder Point (ROP), found in the college textbook Inventory Management and Production Planning and Scheduling, 3rd Edition, by Edward A. Silver, David F. Pyke, Rein Peterson, John Wiley and Sons, 1998, ISBN-13: 978-0471119470. The textbook algorithm for determining safety stock factor "k" knowing expected fill rate is listed in Appendix C, Page 736. In this algorithm, $k=\sqrt{\ln(25/Gu(z)^2)}$, where ln is the natural logarithm and $Gu(z)$ is the expected value of the number of units of shortage per order cycle, also known as the standard normal loss function. Clearly, when the absolute value of $Gu(z)$ is greater than or equal to five (5), the formula computes the natural logarithm of a number less than one (1), which results in a negative number. The square root of a negative number is irrational, which results in an invalid value. Thus, the classic textbook formula is unable to determine safety stock factor "k" for parts where the absolute value of $Gu(z)$ is greater than or equal to five (5), leading to the need for a new general purpose solution.

The reorder point determination unit 112 is configured to determine the reorder point 132 based on the value of the safety stock factor (k) determined by the safety stock value determination unit 110. For example, the reorder point determination unit 112 can determine the level of inventory (e.g., the reorder point 132) that triggers an action to replenish the item 60, so that a level of extra stock (e.g., a safety stock) of the item 60 is maintained at the store 70 to mitigate risk of stock-outs caused by uncertainties in demand and lead time. The reorder point 132 can be based on expected demand for the item 60 occurring within lead time. For a consumable item, the lead time may be a procurement lead time for reordering the item 60 (e.g., the lead time 140). For a repairable item, the lead time may be a weighted lead time based on a turnaround time for repairing the item 60, a condemnation rate for discarding the item 60, a procurement lead time for ordering a replacement item 60, or a combination thereof. The reorder point 132 can include safety stock based on the standard deviation of demand occurring within lead time.

The reorder quantity 134 can be based on a fixed order cost incurred with each replenishment, a periodic demand for the item 60 (e.g., demand rate 136), a price for reordering the item 60 (e.g., price 138), and a carrying cost for tying up one dollar of capital in inventory. The stock level 135 is the sum of the reorder point 132 and the reorder quantity 134.

The stock level 135 corresponds to how many items 60 would be needed for the store 70 to be considered "fully stocked." Thus, the inventory level 142 reaches the reorder point 132, the stock level 135 corresponds to the sum of the inventory level 142 (at the reorder point 132) and the reorder quantity 134.

The controller 102 can detect a change in at least one of an inventory count of the item 60 (e.g., the inventory level 142), a target fill rate of the item 60 (e.g., the first inventory fill rate 146), a target expected backorder quantity of the item 60, a target availability of the item 60, or a target average days delay of the item 60. The controller 102 can also detect a change in at least one the values on which the reorder quantity 134 or reorder point 132 are based. For example, data indicating the above-factors is provided to the controller 102. As a non-limiting example, each time the item 60 is ordered, data indicating the order is provided to the controller 102 such that the controller 102 can detect changes in the inventory count and the periodic demand. As another example, the controller 102 can track the repair turnaround time for a particular order of the item 60 and compare it to previous repair turnaround times to detect changes. The controller 102 can also adjust at least one of the reorder point 132 or the reorder quantity 134 based on the change(s).

The controller 102 can display the reorder point 132 and the corresponding reorder quantity 134 at the display device 106 via the second interface 119. The controller 102 can also display the safety stock factor (k) at the display device 106 via the second interface 119. According to one implementation, in response to a determination that the inventory level 142 of the item 60 is at the reorder point 132 or below the reorder point 132, the controller 102 can initiate an automated order of the item 60 based on the reorder quantity 134. According to some implementations, sensors can be positioned to focus on the inventory of the item 60. The sensors can include at least one of a camera configured to capture images of the items 60, a scale configured to weigh the items 60, etc. Based on sensor data, the controller 102 can determine the inventory level 142 of the item 60 at any given point in time. Thus, the controller 102 can use sensor data to determine the inventory level 142 of the item 60 at any given point in time. According to another implementation, in response to a determination that the inventory level 142 of the item 60 is at the reorder point 132 or below the reorder point 132, the controller 102 can initiate an automated order of the item 60 to refill the inventory level 142 to a stock level 135. The stock level 135 corresponds to a summation of the reorder point 132 and the reorder quantity 134. The inventory tracking unit 150 is configured to update inventory data responsive to receiving an indication that an automated order has been fulfilled. In response to updating the inventory data, the controller 102 automatically generates and prints (or causes to be printed) shipping labels for pending orders of the item 60, generates and prints (or causes to be printed) a report that indicates the updated inventory of the item 60, and displays the updated inventory at the display device 106 via the second interface 119.

According to one implementation, initiating the automated order of the item 60 can include generating a signal and sending the signal to a three-dimensional (3D) printing machine. The 3D printing machine can make (e.g., print) additional items 60 in response to receiving the signal. In some implementations, the 3D printing machine is integrated into the controller 102. The controller 102 can generate data used by the 3D printing machine to make the additional items 60. For example, the controller 102 can generate specifications of the item 60 that are used by the 3D printing machine to make the additional items 60. Based on the data (e.g., the specifications), the 3D printing machine can make the additional items 60 to refill the inventory.

The steady-state determination unit 114 is configured to determine a beginning period of time and an ending period of time over which to measure time-averaged inventory under steady-state conditions. As used herein, a "steady-state inventory level" corresponds to average inventory level over time with an amount of fluctuations that is less than a fluctuation threshold. Steady-state inventory is estimated by averaging results from multiple simulations, each with randomly generated demand, where time-averaged inventory level is measured between the beginning and the ending period of time. A confidence level may be estimated using a Student t-test for small sample sizes, where the result from one simulation equates to one sample. The Student t-test compares two small sets of quantitative data when samples are collected independently of one another.

To determine the point in time at which to begin measuring steady-state inventory levels using simulation, the first interface 118 is configured to receive an indication of the initial inventory level 142 for the item 60, an indication of the demand rate 136 for the item 60, an indication of the lead time 140 for reordering the item 60, and an indication of the reorder quantity 134 for the item 60. For example, the first interface 118 can receive the data 130 from the first inventory model or the data 130 can be automatically determined at the controller 102. The steady-state determination unit 114 is configured to estimate an amount of time for the initial inventory level 142 to be depleted, based on the initial inventory level 142 and the demand rate 136. As a non-limiting example, if the inventory level 142 of the item 60 is one-hundred and the demand rate 136 for the item 60 is one unit per day, the steady-state determination unit 114 will estimate that the amount of time for the inventory level 142 to be depleted is approximately one-hundred days.

Thus, the steady-state determination unit enables an automated process for determining a warm-up period associated with simulating inventory level over time under steady-state conditions that are not biased by initial stock levels. As described herein, the "warm-up period" is associated with simulating the inventory level corresponds to the period of time between the initial monitoring of the inventory level and the decrease in substantial fluctuations in the inventory level to a steady-state condition.

The steady-state determination unit 114 may add one or more order cycles (e.g., the number of months of demand the reorder quantity 134 will supply) as specified by a user (e.g., one) to the warm-up period. This becomes the point in time at which to begin measuring inventory level under simulated steady-state conditions. The steady-state determination unit 114 may add one or more order cycles to the beginning time (e.g., ten) to determine the ending time for simulating steady-state inventory level. Average inventory level during the simulation, measured between the starting time and ending time, will achieve steady state more quickly than if measuring from time zero and more predictably than if measuring over an arbitrary length of time.

The backorder determination unit 116 is configured to determine the time-averaged expected amount of backorders (EBO) for the item 60 using a backorder function. To illustrate, the first interface 118 is configured to receive the data 130 indicating the reorder point 132 for the item 60, the reorder quantity 134 for the item 60, the demand rate 136 for the item 60, the price 138 for reordering the item 60, and the lead time 140 for reordering the item 60. The backorder function is based on the reorder point 132, the reorder quantity 134, the demand rate 136, and the lead time 140. For example, the backorder function is expressed as $EBO = 1/Q * \Sigma_{i=1}^{Q}(\lambda L + \Sigma_{j=0}^{r+i-}(P(X \le j)-1)) + \max\{0,-r\}$, where Q is the reorder quantity 134, $\lambda$ is the demand rate 136, L is the lead time 140, r is the reorder point 132, X is a random variable representing the demand during the lead time 140, and $P(X \le j)$ is the probability that X is less than or equal to the value of j, which varies from zero (0) to the reorder quantity 134 plus the reorder point 132 minus one. According to the above-expression, the backorder function is based on: (1) a reciprocal of the reorder quantity 134

$$\left(e.g., \frac{1}{Q}\right);$$

(2) a product of the demand rate 136 and the lead time 140 (e.g., $\lambda L$); and, an addition of the larger of zero or the negative value of the reorder point 132 (e.g. $\max\{0,-r\}$).

Thus, the backorder function enables the controller 102 to determine the time-averaged expected amount of backorders (EBO) independent of a relationship between the cycle time 144 and the lead time 140. For example, the backorder function enables the controller 102 to determine the time-averaged expected amount of backorders (EBO) if the lead time 140 is greater than the cycle time 144, if the lead time 140 is less than the cycle time 144, or if the lead time 140 is equal to the cycle time 144.

Figure 4:
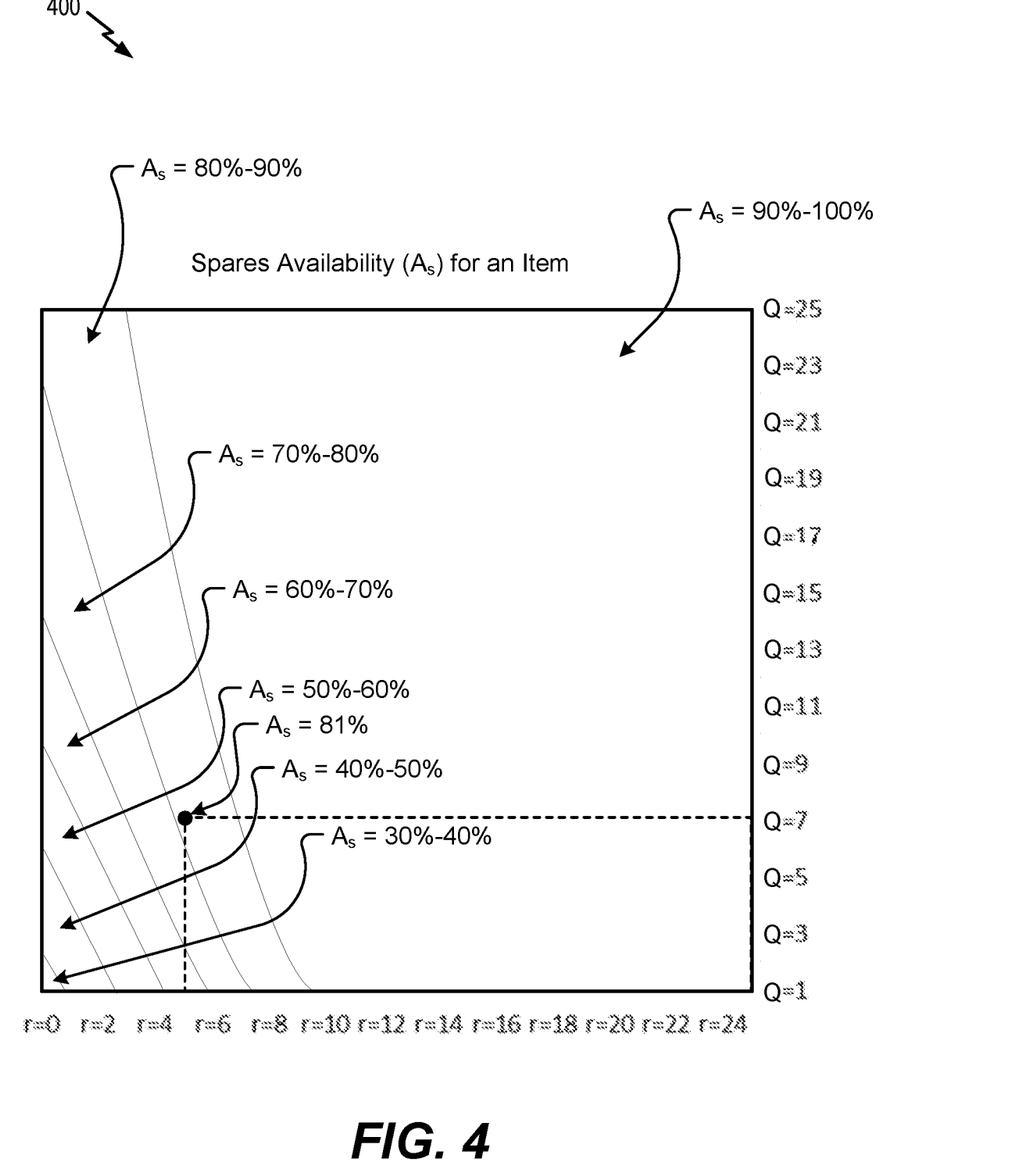
FIG. 4 is a graph illustrating an example of an expected end-item availability based on a backorder function that is independent of a relationship between cycle time and lead time.

After the time-averaged expected amount of backorders (EBO) is determined, the controller 102 can determine expected spares availability $E(A_S)$ for the item 60. The expected spares availability $E(A_S)$ for an item can be expressed as $$E(A_s) = \left(1 - \frac{EBO}{F * QPA}\right)^{QPA},$$

where QPA is the quantity per application, and F is the fleet size (e.g., the number of pieces of equipment, such as vehicles, aircraft, ships, trains, etc.). Thus, given the closed-form estimate for the time-averaged expected amount of backorders (EBO), the expected spares availability $E(A_S)$ for an item can be identified based on any pair of reorder quantity (Q) and reorder point (r). A graph illustrating the expected spares availability $E(A_S)$ for an item is shown in FIG. 4.

Figure 2:
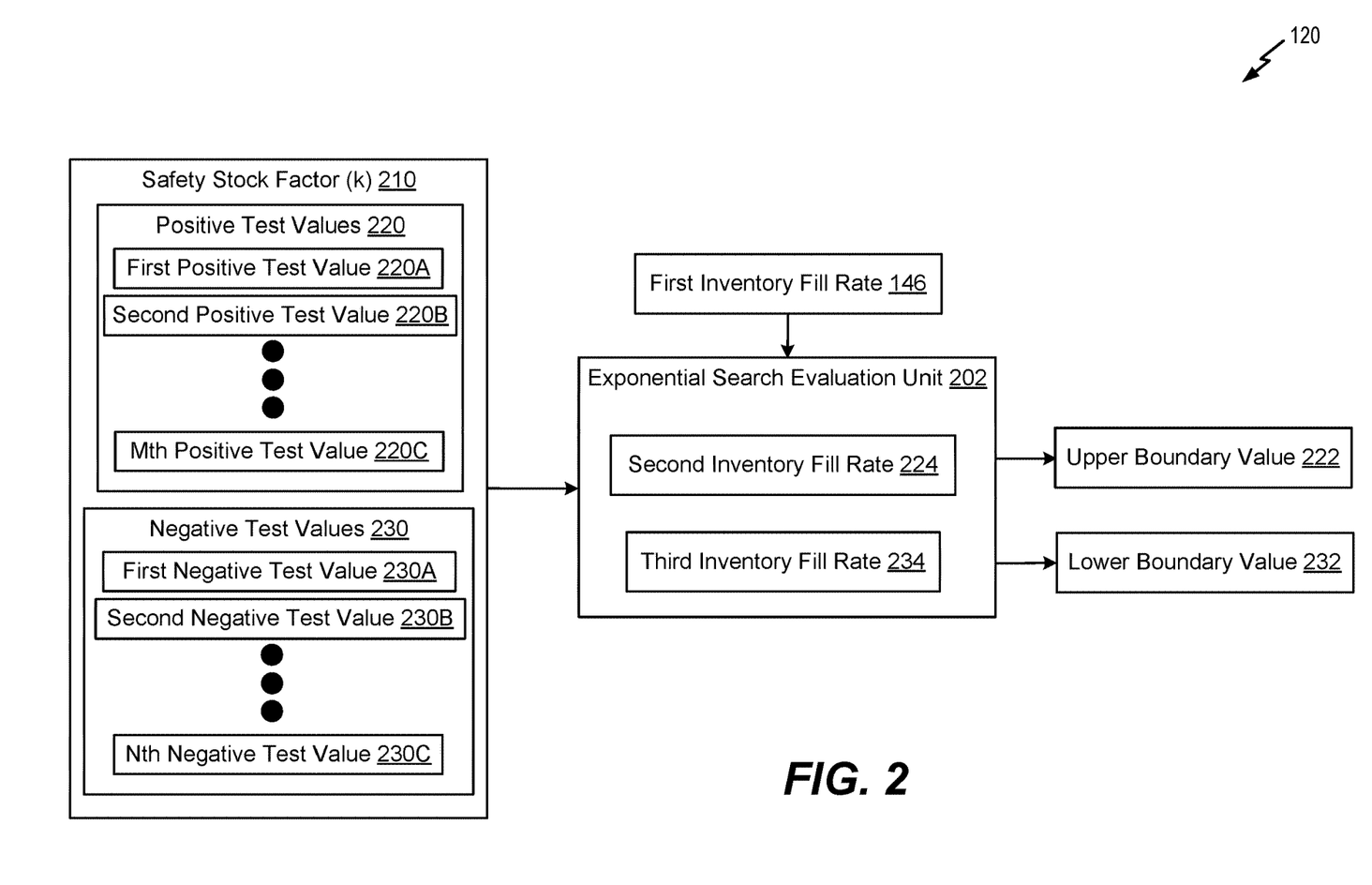
FIG. 2 is a diagram of an example of an exponential search unit to discover upper and lower bounds of a safety stock factor.

FIG. 2 is a diagram of the exponential search unit 120. The exponential search unit 120 can be implemented by a processor executing the instructions 108 stored in the memory 104. The exponential search unit 120 is configured to perform an exponential search to determine an upper boundary value 222 of a safety stock factor (k) 210 that results in a second inventory fill rate 224 that is greater than the first inventory fill rate 146 and a lower boundary value 232 of the safety stock factor (k) 210 that results in a third inventory fill rate 234 that is less than the first inventory fill rate 146.

The exponential search unit 120 includes an exponential search evaluation unit 202. The first inventory fill rate 146 (e.g., the "target" inventory fill rate) is provided to the exponential search evaluation unit 202. Positive test values 220 of the safety stock factor (k) 210 are provided to the exponential search evaluation unit 202 to determine the upper boundary value 222 of the safety stock factor (k) 210 that results in the second inventory fill rate 224. The positive test values 220 include a first positive test value 220A, that is initially set to one (1), a second positive test value 220B, and an Mth positive test value 220C, where M is a positive integer that is a power of two (2).

The controller 102 iteratively multiplies positive test values 220 of the safety stock factor (k) 210 by two until a particular test value 220 is identified that results in the second inventory fill rate 224. For example, the first positive test value 220A of the safety stock factor (k) 210 is provided to the exponential search evaluation unit 202 to determine a particular inventory fill rate associated with the first positive test value 220A. If the particular inventory fill rate is greater than the first inventory fill rate 146, the particular inventory fill rate is identified as the second inventory fill rate 224 and the first positive test value 220A corresponds to the upper boundary value 222.

However, if the particular inventory fill rate is not greater than the first inventory fill rate 142, the controller 102 multiplies the first positive test value 220A by two to generate the second positive test value 220B of the safety stock factor (k) 210. The second positive test value 220B is provided to the exponential search evaluation unit 202 to determine a particular inventory fill rate associated with the second positive test value 220B. If the particular inventory fill rate is greater than the first inventory fill rate 146, the particular inventory fill rate is identified as the second inventory fill rate 224 and the second positive test value 220B corresponds to the upper boundary value 222. The process is repeated until the exponential search unit 120 identifies a positive test value 220 that results in a particular inventory fill rate that is greater than the first inventory fill rate 146.

In a similar manner, negative test values 230 of the safety stock factor (k) 210 are provided to the exponential search evaluation unit 202 to determine the lower boundary value 232 of the safety stock factor (k) 210 that results in the third inventory fill rate 234. The negative test values 230 include a first negative test value 230A, that is initially set to negative one (−1), a second negative test value 230B, and an Nth negative test value 230C, where N is a negative integer that is a power of two (2) multiplied by negative one (−1).

The controller 102 iteratively multiplies negative test values 230 of the safety stock factor (k) 210 by two until a particular test value 230 is identified that results in the third inventory fill rate 234. For example, the first negative test value 230A of the safety stock factor (k) 210 is provided to the exponential search evaluation unit 202 to determine a particular inventory fill rate associated with the first negative test value 230A. If the particular inventory fill rate is less than the first inventory fill rate 146, the particular inventory fill rate is identified as the third inventory fill rate 234 and the first negative test value 230A corresponds to the lower boundary value 232.

Figure 3:
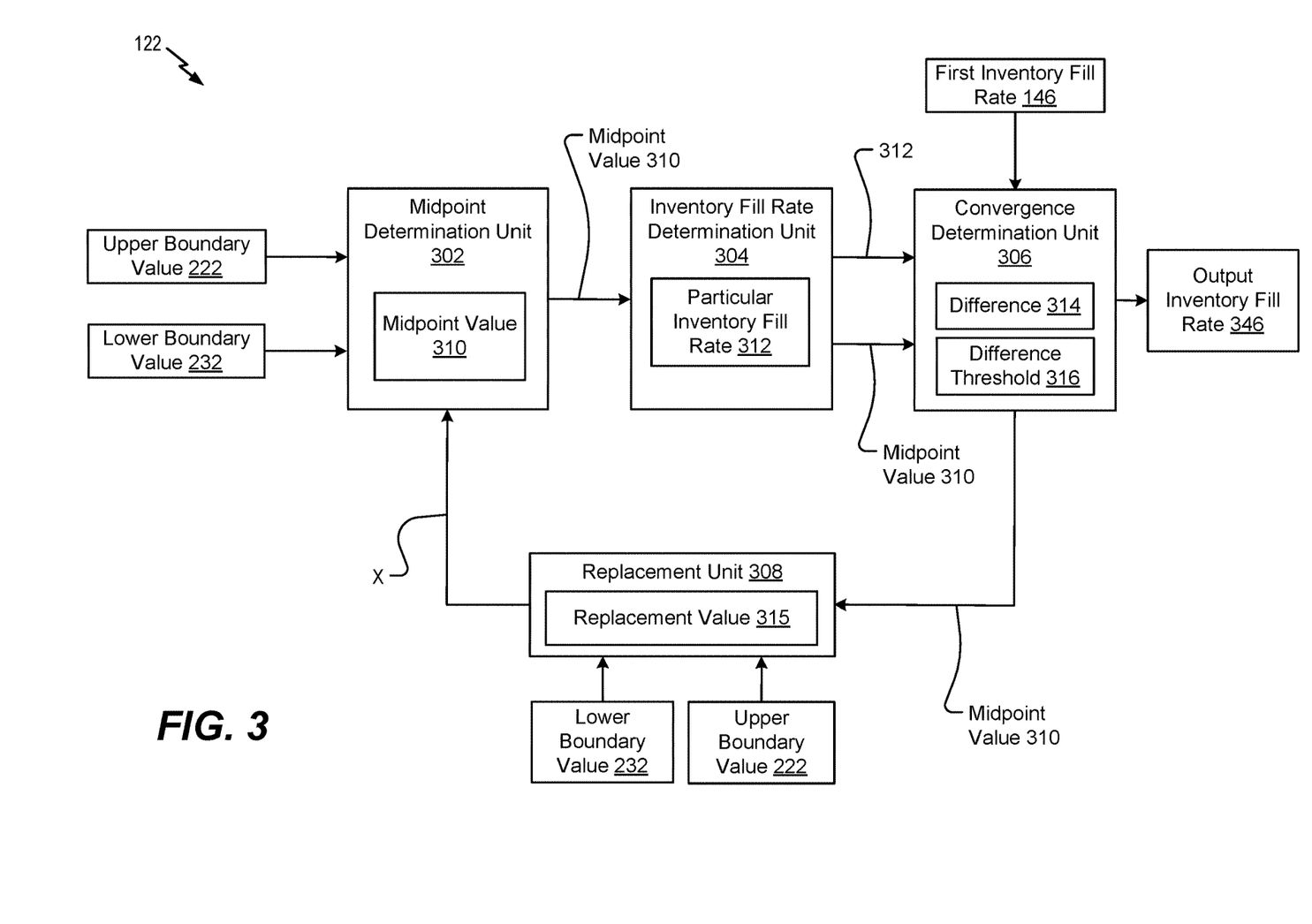
FIG. 3 is a diagram of an example of a recursive bisection search unit to discover the safety stock factor which lies within the upper and lower bounds.

However, if the particular inventory fill rate is not less than the first inventory fill rate 142, the controller 102 multiplies the first negative test value 230A by two to generate the second negative test value 230B of the safety stock factor (k) 210. The second negative test value 230B is provided to the exponential search evaluation unit 202 to determine a particular inventory fill rate associated with the second negative test value 230B. If the particular inventory fill rate is less than the first inventory fill rate 146, the particular inventory fill rate is identified as the third inventory fill rate 234 and the second negative test value 230B corresponds to the lower boundary value 232. The process is repeated until the exponential search unit 120 identifies a negative test value 230 that results in a particular inventory fill rate that is less than the first inventory fill rate 146. The upper boundary value 222 and the lower boundary value 232 are provided to the recursive bisection search unit 122.

FIG. 3 is a diagram of the recursive bisection search unit 122. The recursive bisection search unit 122 can be implemented by a processor executing the instructions 108 stored in the memory 104. The recursive bisection search unit 122 is configured to perform a recursive bisection search based on the upper boundary value 222 and the lower boundary value 232 to determine a value of the safety stock factor (k) 210 that results in an output inventory fill rate 346 converging with the first inventory fill rate 146. The recursive bisection search unit 122 includes a midpoint determination unit 302, an inventory fill rate determination unit 304, a convergence determination unit 306, and a replacement unit 308. Each unit 302, 304, 306, 308 can be implemented by a processor executing the instructions 108 stored in the memory 104.

The recursive bisection search unit 122 is configured to perform a first iteration of a bisection search. During the first iteration of the bisection search, the midpoint determination unit 302 is configured to determine a midpoint value 310 between the upper boundary value 222 and the lower boundary value 232. For example, the exponential search evaluation unit 202 of FIG. 2 provides the boundary values 222, 232 to the midpoint determination unit 302, and the midpoint determination unit 302 adds the values 222, 232 and divides the resulting sum by two to generate the midpoint value 310. The midpoint value 310 is provided to the inventory fill rate determination unit 304.

During the first iteration of the bisection search, the inventory fill rate determination unit 304 identifies a particular inventory fill rate 312 based on the midpoint value 310. For example, the midpoint value 310 represents a value of the safety stock factor (k) 210 that is used to determine the particular inventory fill rate 312. The particular inventory fill rate 312 and the midpoint value 310 are provided to the convergence determination unit 306. The convergence determination unit 306 determines whether the particular inventory fill rate 312 converges with the first inventory fill rate 146. For example, the convergence determination unit 306 determines a difference 314 between the particular inventory fill rate 312 and the first inventory fill rate 146. The difference 314 is compared to a difference threshold 316 to determine whether the particular inventory fill rate 312 converges with the first inventory fill rate 146.

If the difference 314 is less than or equal to the difference threshold 316, the particular inventory fill rate 312 converges with the first inventory fill rate 146 and the convergence determination unit 306 identifies the particular inventory fill rate 312 as the output inventory fill rate 346. Additionally, the recursive bisection search unit 122 sets the safety stock factor (k) 210 equal to the midpoint value 310 in response to a determination that the particular inventory fill rate 312 converges with the first inventory fill rate 146.

If the difference 314 is greater than the difference threshold 316, the particular inventory fill rate 312 fails to converge with the first inventory fill rate 146. In response, the replacement unit 308 replaces one of the upper boundary value 222 or the lower boundary value 232 with the midpoint value 310. The determination to replace the upper boundary value 222 or the lower boundary value 232 is based on a relationship between the particular inventory fill rate 312 and the first inventory fill rate 146. For example, if the particular inventory fill rate 312 is greater than the first inventory fill rate 146, the replacement unit 308 replaces the upper boundary value 222 with the midpoint value 310 such that a replacement value 315 (equal to the midpoint value 310) is provided to the midpoint determination unit 302 as the upper boundary value 222. If the particular inventory fill rate 312 is less than the first inventory fill rate 146, the replacement unit 308 replaces the lower boundary value 232 with the midpoint value 310 such that a replacement value 315 (equal to the midpoint value 310) is provided to the midpoint determination unit 302 as the lower boundary value 222.

The recursive bisection search unit 122 performs a second iteration of the bisection search in response to replacing one of the upper boundary value 222 or the lower boundary value 232 with the midpoint value 310. Additional iterations of the bisection search are performed until the convergence determination unit 306 determines that the particular inventory fill rate 312 (of a particular iteration) converges with the first inventory fill rate 146. In response to the determination that the particular inventory fill rate 312 converges with the first inventory fill rate 146, the recursive bisection search unit 122 sets the safety stock factor (k) 210 equal to the midpoint value 310 associated with the particular inventory fill rate 312. As explained with respect to FIG. 1, the reorder point 132 can be determined based on the safety stock factor (k) 210.

The techniques described with respect to FIGS. 2-3 enable rapid safety stock factor (k) determinations compared to conventional techniques. As a non-limiting example, the techniques described with respect to FIGS. 2-3 enable the safety stock value determination unit 110 to determine the safety stock factors (k) 210 in less than four seconds for a collection of five-thousand items, compared to conventional techniques that often take over forty-five minutes to determine the safety stock factor (k) 210. Conventional techniques for determining the safety stock factor (k) often involve much more complex calculations that cause standard processing platforms to "crash" or otherwise be ineffective. The techniques described with respect to FIGS. 2-3 also reduce the number of iterations that are used to determine the safety stock factor (k) 210. For example, conventional techniques require characterizing the problem and setting up the equations to be solved, which can be time-consuming and resource intensive. However, the techniques described with respect to FIGS. 2-3 solve the problem directly and reduce the number of iterations (or test values 220, 230) used based on the exponential search and recursive bisection techniques. Further, the conventional textbook formula cannot calculate a safety stock factor (k) when the standard normal loss function Gu(k) is greater than or equal to the absolute value of five (5), which occurs in about 25% of the cases for a sample list of five-thousand aerospace items.

FIG. 4 is a graph 400 illustrating the expected spares availability ($A_S$) for one item 60. According to the graph 400, the expected spares availability $E(A_S)$ increases as the reorder point (r) (e.g., the reorder point 132) increases. The expected spares availability $E(A_S)$ also increases as the reorder quantity (Q) (e.g., the reorder quantity 134) increases. According to simulation results associated with the graph 400, the expected spares availability $E(A_S)$ is eighty-one percent if the item 60 has a reorder quantity 134 of seven and a reorder point 132 of five.

Figure 5:
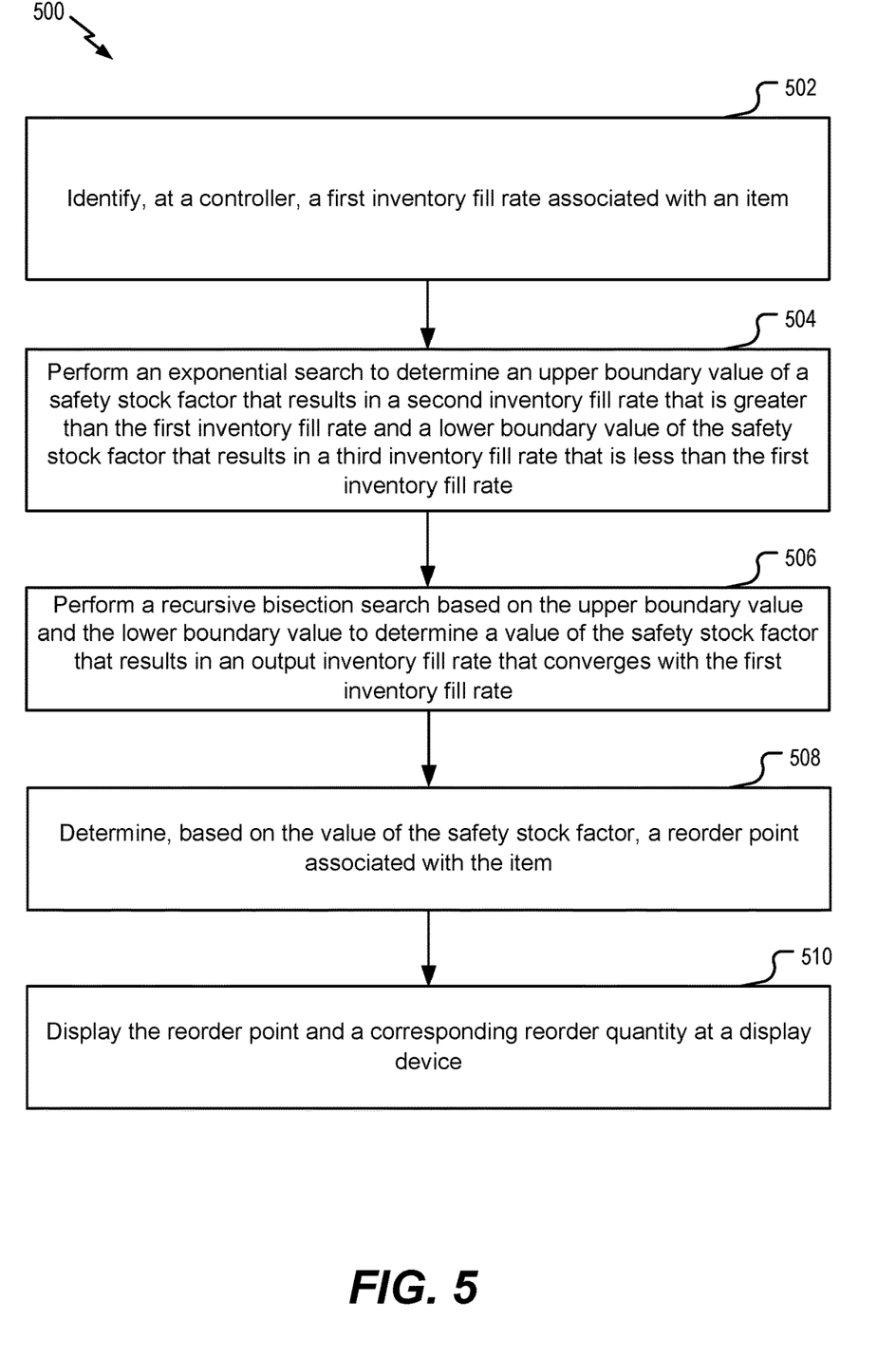
FIG. 5 is a flowchart of a method of processing inventory.

FIG. 5 is a flowchart of a method 500 of processing inventory. In an illustrative example, the method 500 is performed by the system 100.

The method 500 includes identifying, at a controller, a first inventory fill rate associated with an item, at 502. For example, the safety stock value determination unit 110 identifies the first inventory fill rate 146 (e.g., the "target" inventory fill rate) associated with the item 60 from the data 130 provided to the controller 102 via the first interface 118. The item 60 may be either a consumable part or a repairable part.

The method 500 also includes performing an exponential search to determine an upper boundary value and a lower boundary value of a safety stock factor, at 504. The upper boundary value results in a second inventory fill rate that is greater than the first inventory fill rate, and the lower boundary value of the safety stock factor that results in a third inventory fill rate that is less than the first inventory fill rate. For example, the exponential search unit 120 performs the exponential search to determine the upper boundary value 222 of the safety stock factor (k) 210 that results in the second inventory fill rate 224 that is greater than the first inventory fill rate 146 and the lower boundary value 232 of the safety stock factor (k) 210 that results in the third inventory fill rate 234 that is less than the first inventory fill rate 146. According to one implementation, performing the exponential search to determine the upper boundary value 222 includes iteratively multiplying positive test values 220 of the safety stock factor (k) 210 by two until a particular test value is identified that results in the second inventory fill rate 224. The particular test value corresponds to the upper boundary value 222. According to one implementation, performing the exponential search to determine the lower boundary value 232 includes iteratively multiplying negative test values 230 of the safety stock factor (k) 210 by two until a particular test value is identified that results in the third inventory fill rate 234. The particular test value corresponds to the lower boundary value 232.

The method 500 also includes performing a recursive bisection search based on the upper boundary value and the lower boundary value to determine a value of the safety stock factor that results in an output inventory fill rate that converges with the first inventory fill rate, at 506. For example, the recursive bisection search unit 122 performs the recursive bisection search based on the upper boundary value 222 and the lower boundary value 232 to determine the value of the safety stock factor (k) 210 that results in the output inventory fill rate 346 that converges with the first inventory fill rate 146. Performing the recursive bisection search includes performing the first iteration of the bisection search. The first iteration includes determining the midpoint value 310 between the upper boundary value 222 and the lower boundary value 232. The first iteration also includes identifying the particular inventory fill rate 312 based on the midpoint value 310 and determining whether the particular inventory fill rate 312 converges with the first inventory fill rate 146. The particular inventory fill rate 312 converges if the difference 314 between the particular inventory fill rate 312 and the first inventory fill rate 146 is less than the difference threshold 316.

According to one implementation, the method 500 includes setting the safety stock factor (k) 210 equal to the midpoint value 310 in response to a determination that the particular inventory fill rate 312 converges with the first inventory fill rate 146. However, in response to a determination that the particular inventory fill rate 312 fails to converge with the first inventory fill rate 146, the method 500 includes replacing one of the upper boundary value 222 or the lower boundary value with the midpoint value 310. The method 500 also includes performing a second iteration of the bisection search in response to replacing one of the upper boundary value 222 or the lower boundary value 232.

The method 500 also includes determining, based on the value of the safety stock factor, a reorder point associated with the item, at 508. For example, the reorder point determination unit 112 determines the reorder point 132 associated with the item 60 based on the value of the safety stock factor (k) 210. The method 500 also includes displaying the reorder point and the corresponding reorder quantity 134 at a display device, at 510. For example, the display device 106 displays an indication of the reorder point 132 and the corresponding reorder quantity 134. The reorder point 132 and the reorder quantity 134 can be displayed in a worksheet document at the display device 106. According to one implementation, the method 500 includes displaying the value of the safety stock factor (k) 210 at the display device 106. For example, the display device 106 displays the value of the safety stock factor (k) 210 in the worksheet document. The efficiency and the rate at which the value of the safety stock factor (k) 210 is displayed at the display device 106 are improved based on the exponential search and the recursive bisection search. For example, conventional time-consuming and resource intensive techniques for determining the value of the safety stock factor (k) 210 are overcome using the exponential search and the recursive bisection search. As a result, the safety stock factor (k) 210 is displayed at the display device 106 is a more time-efficient manner.

According to one implementation, the method 500 includes initiating an automated order of the item 60 based on the reorder quantity 134 in response to a determination that the inventory level 142 of the item 60 is at the reorder point 132 or below the reorder point 132. According to one implementation, the method 500 includes initiating an automated order of the item 60 to refill the inventory level 142 to a stock level 135 in response to a determination that the inventory level 142 of the item 60 is at the reorder point 132 or below the reorder point 132. The stock level 135 corresponds to the sum of the reorder point 132 and the reorder quantity 134. The method 500 also includes updating inventory data responsive to receiving an indication that an automated order has been fulfilled.

According to one implementation, the method 500 includes generating, in response to a determination that the inventory level 142 of the item 60 is at the reorder point 132 or below the reorder point 132, an alert to order the item 60 based on at least one of ordering the reorder quantity 134 of the item 60 or ordering up to the stock level 135 of the item 60. According to one implementation of the method 500, the reorder point 132 and the reorder quantity 134 are based on at least two of the periodic demand for the item 60, the price 138 for reordering the item 60, the procurement lead time 140 for reordering the item 60, a turnaround time for repairing the item 60, a condemnation rate, a calculation of cycle time 144 for inventory of the item 60, an inventory count (e.g., the inventory level 142) of the item 60, a target fill rate of the item 60, a target backorder quantity of the item 60, a target availability of the item 60, or a target average days delay of the item 60.

The method 500 enables rapid safety stock factor (k) determinations compared to conventional techniques. As a non-limiting example, the method 500 enables determination of the safety stock factor (k) 210 in less than four seconds for a collection of five-thousand items, compared to conventional techniques that often take over forty-five minutes to determine the safety stock factor (k) 210. Conventional techniques for determining the safety stock factor (k) often involve much more complex calculations that cause standard processing platforms to "crash" or otherwise be ineffective. The method 500 also reduces the number of iterations that are used to determine the safety stock factor (k) 210. For example, conventional techniques can require characterizing the problem and setting up the equations to be solved in order to determine safety stock factor (k) 210, which can be time-consuming and resource intensive. However, the method 500 reduces the number of iterations (or test values 220, 230) used and solves the problem directly based on the exponential search and recursive bisection techniques.

Figure 6:
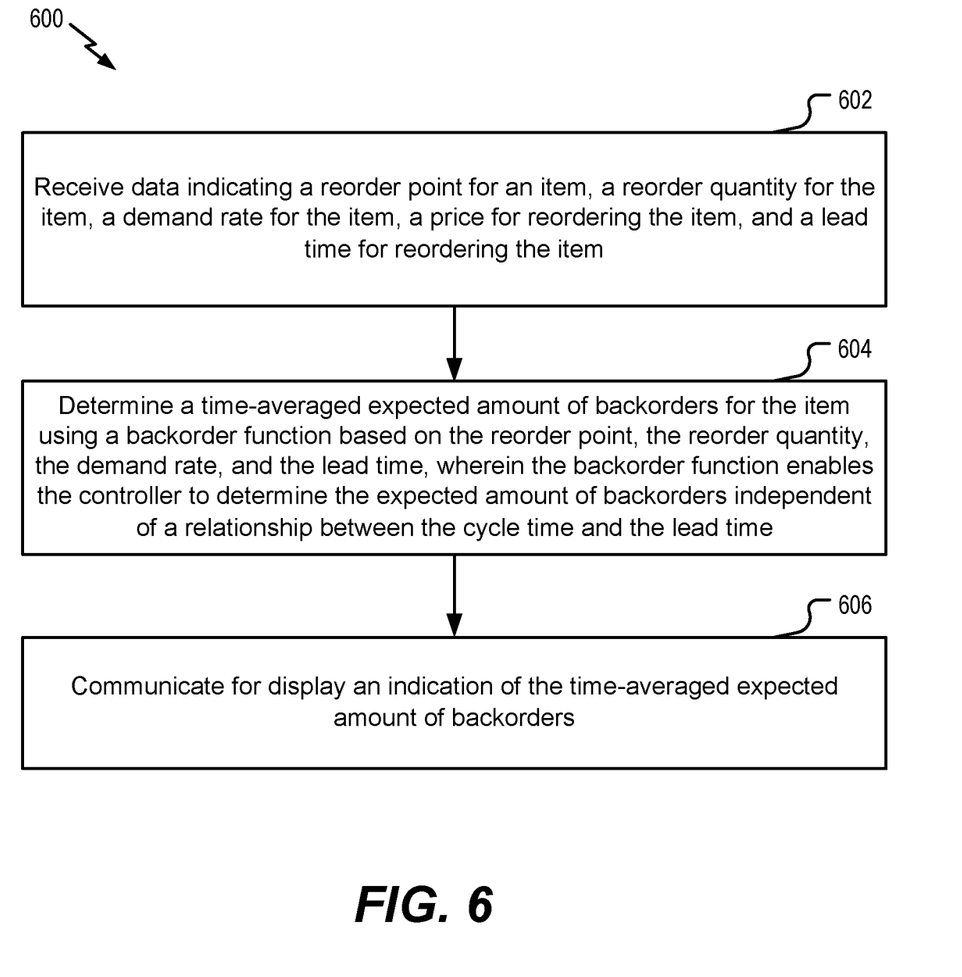
FIG. 6 is a flowchart of another method of processing inventory.

FIG. 6 is a flowchart of another method 600 of processing inventory. In an illustrative example, the method 600 is performed by the system 100.

The method 600 includes receiving data indicating a reorder point for an item, a reorder quantity for the item, a demand rate for the item, a price for reordering the item, and a lead time for reordering the item, at 602. For example, the first interface 118 receives the data 130 indicating the reorder point 132 for the item 60, the reorder quantity 134 for the item 60, the demand rate 136 for the item 60, the price 138 for reordering the item 60, and the lead time 140 for reordering the item 60.

The method 600 also includes determining a time-averaged expected amount of backorders for the item using a backorder function based on the reorder point 132, the reorder quantity 134, the demand rate 136, and the lead time 140, wherein the backorder function enables the controller to determine the time-averaged expected amount of backorders independent of a relationship between a cycle time and the lead time, at 604. For example, the backorder determination unit 116 determines a time-averaged expected amount of backorders (EBO) for the item 60 using the backorder function. The backorder function is based on the reorder point 132, the reorder quantity 134, the demand rate 136, and the lead time 140. For example, the backorder function is expressed as $EBO = 1/Q * \Sigma_{i=1}^{Q}(\lambda L + \Sigma_{j=0}^{r+i-1}(P(X \leq j)-1)) + \max\{0,-r\}$, where Q is the reorder quantity 134, $\lambda$ is the demand rate 136, L is the lead time 140, r is the reorder point 132, X is a random variable representing the demand during the lead time 140, and $P(X \leq j)$ is the probability that X is less than or equal to the value of j, which varies from zero (0) to the reorder quantity 134 plus the reorder point 132 minus one. According to the above-expression, the backorder function is based on a reciprocal of the reorder quantity 134 (e.g., 1/Q), the backorder function is further based on a product of the demand rate 136 and the lead time 140 (e.g., $\lambda L$), and the backorder function is further based on an addition of a larger of zero or the negative value of the reorder point 132 (e.g. $\max\{0,-r\}$).

The method 600 also includes communicating for display an indication of the time-averaged expected amount of backorders, at 606. For example, the backorder determination unit 116 communicates the indication of the time-averaged expected amount of backorders (EBO) to the display device 106 via the second interface 119.

The method 600 enables the controller 102 to determine the time-averaged expected amount of backorders (EBO) independent of a relationship between the cycle time 144 and the lead time 140. For example, the backorder function enables the controller 102 to determine the time-averaged expected amount of backorders (EBO) if the lead time 140 is greater than the cycle time 144, if the lead time 140 is less than the cycle time 144, or if the lead time 140 is equal to the cycle time 144.

Figure 7:
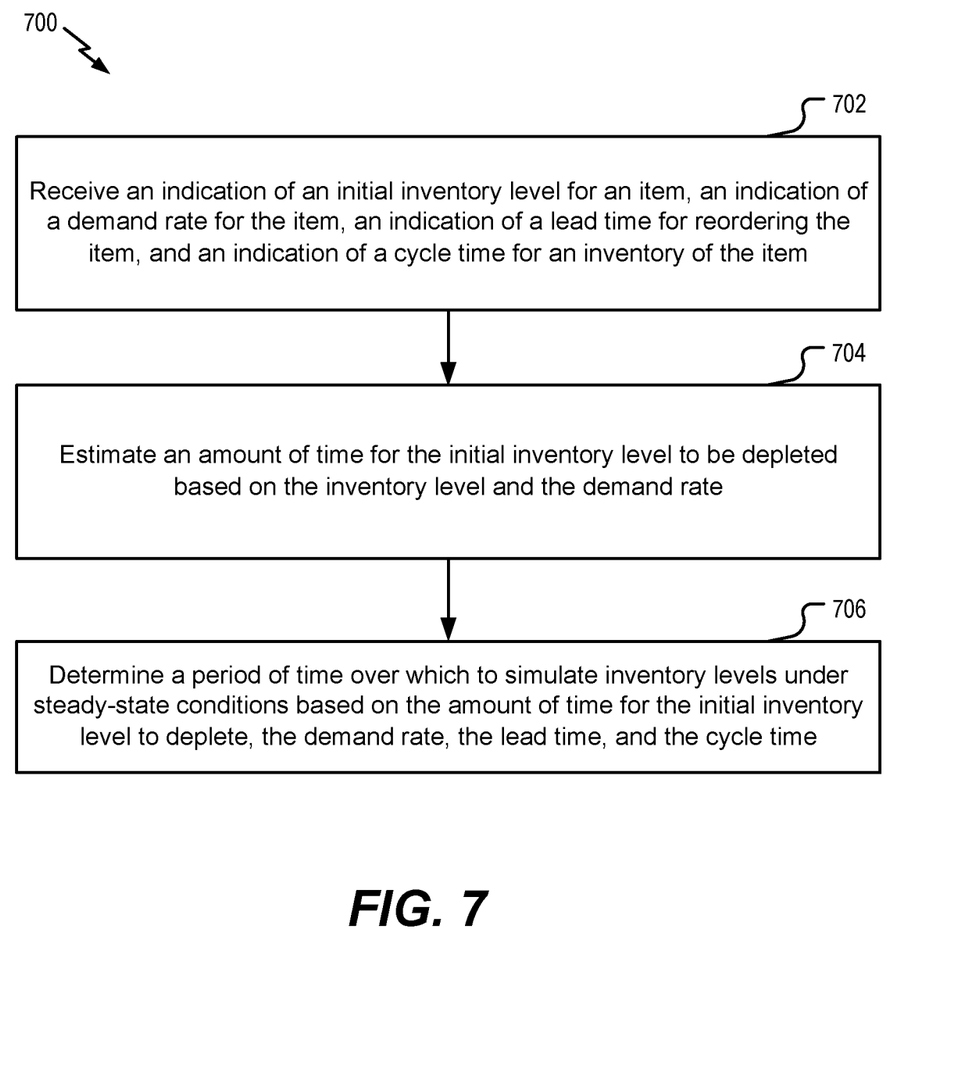
FIG. 7 is a flowchart of another method of processing inventory.

FIG. 7 is a flowchart of another method 700 of processing inventory. In an illustrative example, the method 700 is performed by the system 100.

The method 700 includes receiving an indication of an initial inventory level for an item, an indication of a demand rate for the item, an indication of a lead time for reordering the item, and an indication of a cycle time for an inventory of the item, at 702. For example, the first interface 118 receives an indication of the initial inventory level 142 for the item 60, an indication of the demand rate 136 for the item 60, an indication of the lead time 140 for reordering the item 60, and an indication of the cycle time 144 for an inventory of the item 60.

The method 700 also includes estimating an amount of time for the initial inventory level to be depleted based on the inventory level and the demand rate, at 704. For example, the steady-state determination unit 114 estimates the amount of time for the inventory level 142 to be depleted based on the initial inventory level 142 and the demand rate 136.

The method 700 also includes determining a period of time over which to simulate inventory levels under steady-state conditions based on the amount of time for the initial inventory level to deplete, the demand rate, the lead time, and the cycle time, at 706. For example, the steady-state determination unit 114 determines the period of time (e.g., the "warm-up period") to begin simulating the steady-state inventory based on the amount of time for the inventory level 142 to deplete, the demand rate 136, the lead time 140, and the cycle time 144.

The method 700 of FIG. 7 enables an automated process for determining a warm-up period associated with simulating a supply chain under steady-state conditions that are not biased by initial stock levels.

The examples described herein are intended to provide a general understanding of the various implementations. The examples are not intended to serve as a complete description of all of the elements and features of apparatuses and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of processing inventory, the method comprising:
    identifying, by a controller, a first inventory fill rate associated with an item;
    performing an exponential search to determine:
        an upper boundary value of a safety stock factor that results in a second inventory fill rate that is greater than the first inventory fill rate, wherein performing the exponential search to determine the upper boundary value comprises iteratively multiplying positive test values of the safety stock factor by two until a particular test value is identified that results in the second inventory fill rate, the particular test value corresponding to the upper boundary value; and
        a lower boundary value of the safety stock factor that results in a third inventory fill rate that is less than the first inventory fill rate;
    performing a recursive bisection search based on the upper boundary value and the lower boundary value to determine a value of the safety stock factor that results in an output inventory fill rate that converges with the first inventory fill rate;
    determining, based on the value of the safety stock factor, a reorder point associated with the item; and
    displaying the reorder point and a corresponding reorder quantity at a display device.

2. The method of claim 1, wherein the item includes a consumable part or a repairable part.

3. The method of claim 1, further comprising displaying the value of the safety stock factor at the display device.

4. The method of claim 1, further comprising, in response to determining that an inventory level of the item is at the reorder point or below the reorder point, initiating an automated order of the item based on the reorder quantity.

5. The method of claim 1, further comprising, in response to determining that an inventory level of the item is at the reorder point or below the reorder point, initiating an automated order of the item to refill the inventory level to a stock level, wherein the stock level corresponds to a sum of the reorder point and the reorder quantity.

6. The method of claim 1, further comprising updating inventory data responsive to receiving an indication that an automated order has been fulfilled.

7. The method of claim 1, further comprising generating, in response to determining that an inventory level of the item is at the reorder point or below the reorder point, an alert to order the item based on at least one of the reorder quantity of the item or a stock level of the item.

8. The method of claim 1, further comprising initiating, in response to determining that an inventory level of the item is at the reorder point or below the reorder point, a machine to produce an additional copy of the item.

9. The method of claim 1, wherein performing the exponential search to determine the lower boundary value comprises iteratively multiplying negative test values of the safety stock factor by two until a particular test value is identified that results in the third inventory fill rate, the particular test value corresponding to the lower boundary value.

10. The method of claim 1, wherein performing the recursive bisection search comprises performing a first iteration of a bisection search, wherein the first iteration comprises:

determining a midpoint value between the upper boundary value and the lower boundary value;

identifying a particular inventory fill rate based on the midpoint value; and determining whether the particular inventory fill rate converges with the first inventory fill rate.

11. The method of claim 10, further comprising setting the safety stock factor equal to the midpoint value in response to determining that the particular inventory fill rate converges with the first inventory fill rate.

12. The method of claim 10, further comprising, in response to determining that the particular inventory fill rate fails to converge with the first inventory fill rate:

replacing one of the upper boundary value or the lower boundary value with the midpoint value; and performing a second iteration of the bisection search in response to replacing one of the upper boundary value or the lower boundary value.

13. The method of claim 1, further comprising determining an expected amount of backorders for the item using a backorder function based on the reorder point, the corresponding reorder quantity, a demand rate for the item, and a lead time for reordering the item, wherein the backorder function enables the controller to determine the expected amount of backorders independent of a relationship between a cycle time and the lead time.

14. The method of claim 1, wherein the reorder point and the reorder quantity are further based on a periodic demand for the item, a price for reordering the item, a procurement lead time for reordering the item, a turnaround time for repairing the item, a condemnation rate, a calculation of cycle time for inventory of the item, an inventory count of the item, a target fill rate of the item, a target backorder quantity of the item, a target availability of the item, or a target average days delay of the item.

15. The method of claim 14, further comprising:

detecting a change in at least one of the periodic demand, the price, the procurement lead time, the turnaround time, the condemnation rate, the inventory count, the target fill rate, the target backorder quantity, the target availability, or the target average days delay of the item; and adjusting at least one of the reorder point or the reorder quantity based on the change.

16. An apparatus comprising:

a controller configured to:

identify a first inventory fill rate associated with an item;

perform an exponential search to determine:

an upper boundary value of a safety stock factor that results in a second inventory fill rate that is greater than the first inventory fill rate, wherein performing the exponential search to determine the upper boundary value comprises iteratively multiplying positive test values of the safety stock factor by two until a particular test value is identified that results in the second inventory fill rate, the particular test value corresponding to the upper boundary value; and a lower boundary value of the safety stock factor that results in a third inventory fill rate that is less than the first inventory fill rate;

perform a recursive bisection search based on the upper boundary value and the lower boundary value to determine a value of the safety stock factor that results in an output inventory fill rate that converges with the first inventory fill rate;

determine, based on the value of the safety stock factor, a reorder point associated with the item; and an interface coupled to the controller, the interface configured to communicate for display an indication of the reorder point and a corresponding reorder quantity.

17. The method of claim 13, wherein the backorder function is based on a reciprocal of the reorder quantity.

18. The method of claim 17, wherein the backorder function is further based on a product of the demand rate and the lead time.

19. The method of claim 18, wherein the backorder function is further based on an addition of a larger of zero or a negative value of the reorder point.

20. The apparatus of claim 16, wherein the controller is further configured to:

estimate an amount of time for an inventory level of the item to be depleted based on an inventory level and a demand rate; and determine a period of time to achieve a steady-state inventory based on the amount of time for the inventory level to be depleted, the demand rate, a lead time for reordering the item, and a cycle time for an inventory of the item.

* * * * *